(12) United States Patent
Ursem et al.

(10) Patent No.: US 9,132,383 B2
(45) Date of Patent: Sep. 15, 2015

(54) METHOD FOR THE REMOVAL OF A GASEOUS FLUID AND ARRANGEMENT THEREFORE

(75) Inventors: Willibrordus Nicolaas Johannes Ursem, Hellevoetsluis (NL); Rein André Roos, Nocé (FR); Johannes Cornelis Maria Marijnissen, Breda (NL)

(73) Assignee: MEMIC EUROPE B.V., Gassel (NL)

( * ) Notice: Subject to any disclaimer, the term of this patent is extended or adjusted under 35 U.S.C. 154(b) by 784 days.

(21) Appl. No.: 13/386,018

(22) PCT Filed: Jul. 21, 2010

(86) PCT No.: PCT/NL2010/050468
§ 371 (c)(1),
(2), (4) Date: Apr. 4, 2012

(87) PCT Pub. No.: WO2011/010918
PCT Pub. Date: Jan. 27, 2011

(65) Prior Publication Data
US 2012/0180658 A1     Jul. 19, 2012

(30) Foreign Application Priority Data

Jul. 22, 2009   (NL) .................................. 2003259

(51) Int. Cl.
*B03C 3/16* (2006.01)
*B01D 53/32* (2006.01)
(Continued)

(52) U.S. Cl.
CPC . *B01D 53/32* (2013.01); *A01K 1/01* (2013.01); *A01K 29/00* (2013.01); *B01D 53/78* (2013.01); *B03C 3/08* (2013.01); *B03C 3/41* (2013.01); *B03C 3/47* (2013.01); *B01D 2257/90* (2013.01); *B01D 2259/818* (2013.01); *B03C 2201/10* (2013.01)

(58) Field of Classification Search
CPC combination set(s) only.
See application file for complete search history.

(56) References Cited

U.S. PATENT DOCUMENTS 4,218,233 A     8/1980   Hackett
4,643,745 A *   2/1987   Sakakibara et al. .............. 96/76
(Continued)

FOREIGN PATENT DOCUMENTS

FR     2680474 A1     2/1993
JP     60-044023 A    3/1985
(Continued)

OTHER PUBLICATIONS

Search Report in International Application PCT/NL2010/050468 mailed Jan. 20, 2011.
(Continued)

*Primary Examiner* — Duane Smith
*Assistant Examiner* — Sonji Turner
(74) *Attorney, Agent, or Firm* — Sunit Talapatra; Foley & Lardner LLP

(57) ABSTRACT

The invention provides a method for the removal of a gaseous fluid comprising (a) applying an electric field between a first electrode arranged to generate a corona discharge and a second electrode, comprising a haze-permeable electrically conductive sieve of a plurality of conductive strands, (b) atomizing a liquid to providing a liquid haze between the first and the second electrode, wherein the liquid is a solvent for the gaseous fluid, and (c) arranging a substrate behind, relative to the first electrode, the second electrode.

7 Claims, 6 Drawing Sheets

(51) Int. Cl.
- *A01K 1/01* (2006.01)
- *A01K 29/00* (2006.01)
- *B01D 53/78* (2006.01)
- *B03C 3/08* (2006.01)
- *B03C 3/41* (2006.01)
- *B03C 3/47* (2006.01)

(56) References Cited

U.S. PATENT DOCUMENTS

| | | | | |
|---|---|---|---|---|
| 4,670,026 A | * | 6/1987 | Hoenig | 95/73 |
| 4,734,105 A | * | 3/1988 | Eliasson et al. | 95/62 |
| 5,695,549 A | * | 12/1997 | Feldman et al. | 96/55 |
| 6,302,944 B1 | * | 10/2001 | Hoenig | 96/16 |
| 6,863,826 B2 | | 3/2005 | Sheets | |
| 7,025,806 B2 | * | 4/2006 | Coppom et al. | 95/59 |
| 7,513,933 B2 | * | 4/2009 | Coppom et al. | 95/70 |
| 7,597,750 B1 | * | 10/2009 | Krigmont | 96/49 |
| 7,717,980 B2 | * | 5/2010 | Tepper et al. | 95/71 |
| 8,425,657 B2 | * | 4/2013 | Ursem et al. | 95/57 |
| 2002/0020677 A1 | | 2/2002 | Noll | |
| 2004/0120845 A1 | * | 6/2004 | Potember et al. | 422/4 |
| 2006/0039844 A1 | * | 2/2006 | Gutson et al. | 423/240 R |
| 2006/0180023 A1 | * | 8/2006 | Coppom et al. | 95/59 |
| 2006/0185511 A1 | * | 8/2006 | Tepper | 95/71 |
| 2007/0009411 A1 | | 1/2007 | Ray et al. | |
| 2007/0202028 A1 | * | 8/2007 | Altman et al. | 423/242.1 |
| 2009/0277329 A1 | * | 11/2009 | Ursem et al. | 95/75 |
| 2010/0326274 A1 | * | 12/2010 | Ursem et al. | 95/57 |

FOREIGN PATENT DOCUMENTS

| | | | | |
|---|---|---|---|---|
| JP | 09-276734 A | 10/1997 | | |
| JP | 2001-096189 A | 4/2001 | | |
| WO | WO 2004033104 A1 | * | 4/2004 | B03C 3/53 |
| WO | WO-2009/078713 A1 | 6/2009 | | |

OTHER PUBLICATIONS

Written Opinion of the International Searching Authority in International Application PCT/NL2010/050468.

* cited by examiner

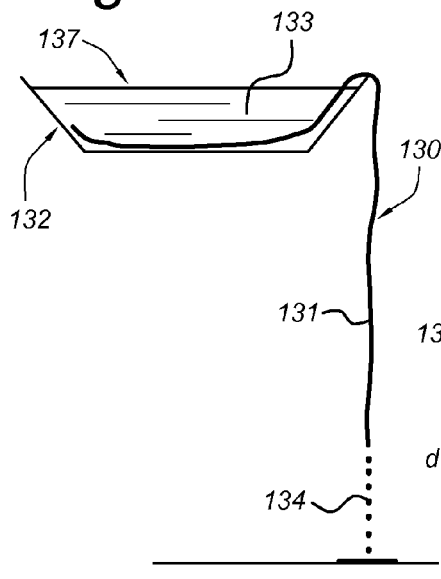
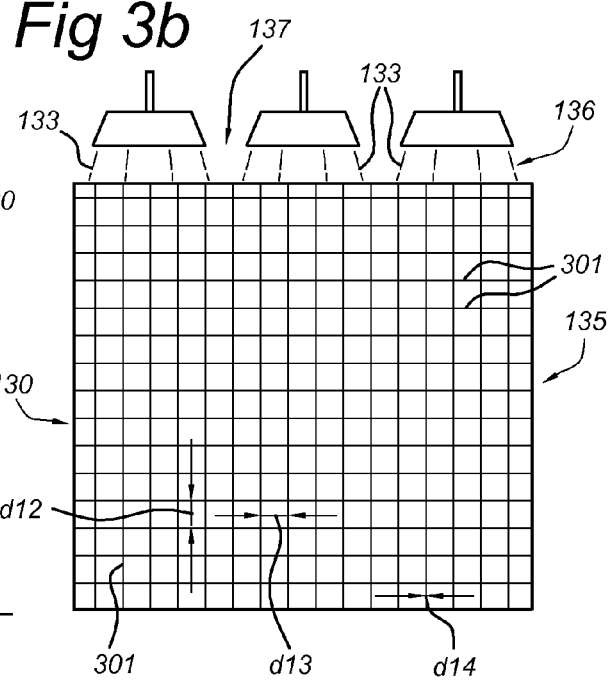
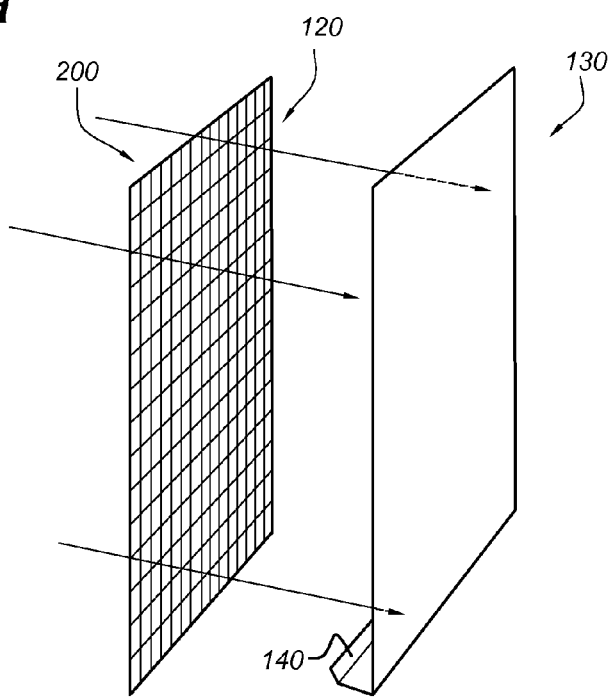

METHOD FOR THE REMOVAL OF A GASEOUS FLUID AND ARRANGEMENT THEREFORE

FIELD

The present invention relates to a method for the removal of a gaseous fluid, especially $NH_3$, and an arrangement therefore.

BACKGROUND

Cattle breeding and the production of animal waste go together. The generation of waste, solid, liquid and gaseous, becomes an increasing problem. In the art, several solutions are suggested.

US2002020677 for instance describes an integrated farm animal waste treatment system for treating solid and liquid farm animal wastes while recovering waste heat energy generated during the treatment process. The preferred embodiment includes a portable chemical treatment process that can be moved from one waste processing site to another in order to treat a variety of different types of animal waste in varying amounts on a batch basis. The preferred embodiment provides for the destruction of hazardous solids, liquids and gases. In addition, the process includes means to isolate and recover valuable by-products of farm animal waste, such as nitrogen and ammonia, for use in manufacturing commercial-grade fertilizer. The preferred embodiment also includes means for capturing waste heat for use either internally in the waste treatment process itself or, alternatively as a source of heat for the farm creating the animal wastes. The same basic process, but with additional, more permanent features, can be installed and operated on either a batch or continuous basis as a permanent installation, depending on the need within a particular farming community.

In U.S. Pat. No. 6,863,826 it is described that animal waste such as fecal material from swine, chicken, turkey, and cattle is converted into useful forms such as fertilizer, other types of soil builders, and even nutrient feed additives. Devices, systems, and methods are provided that allow economical conversion and in many instances, alleviate the production and release of undesirable gases such as sulphide and ammonia. In one embodiment, undesirable anaerobic and facultative anaerobic bacteria are killed at a greater rate than desirable soil compatible aerobic bacteria. The use of low temperature killing diminishes off gassing commonly associated with other techniques, and the use of gas trapping additives such as zeolites provides enhanced soil building qualities such as slow release of nitrogen and slow release of moisture to soil. The methods allow convenient adjustment of composition, allowing conversion of waste into tailored designer fertilizer suited for particular soils. Other embodiments provide other soil building qualities as well as nutrient qualities for feedstock used in animal husbandry such as aquaculture.

U.S. Pat. No. 4,218,233 describes a method for reducing offensive odours in poultry houses comprising adding at least 10 pounds of composted cow manure per ton of poultry manure. The method is ascribed to substantially reduce offensive odour in poultry houses especially ammonia odour and thereby provides a healthier environment for poultry and poultry workers. Since the ammonia loss to the environment is reduced, the nitrogen is retained in the poultry manure providing a product with higher nitrogen content.

US2004120845 describes a method and apparatus for neutralizing airborne pathogens in ventilated air, and in heating or air conditioning systems. The pathogen neutralization system is assumed to be effective against a wide spectrum of pathogens, to incorporate commercially available components, and to be readily integrated into commercial HVAC systems where it neutralizes airborne pathogens in large volumes of ventilated air in real time without any chemical reagents. Typically, the system has a flow-through reaction chamber that contains a UV light source that emits short intense flashes of broad-spectrum UV light, a source of water vapour or spray, and an ozone generator. The system is assumed to generate highly reactive ozone intermediates by irradiating ozone gas with UV light in the presence of water droplets or water vapour. According to US2004120845, the pathogens that can be neutralized by this system include bacteria, viruses, spores, fungi and parasites.

SUMMARY OF THE INVENTION

The removal of ammonia ($NH_3$), or other gasses that are not desired, seem not be easily solved in the prior art. In relation to animal waste, complicated systems are suggested which are mainly directed to the removal or reduction of liquid and solid animal waste.

There is however a need for reducing the exhaust of $NH_3$ (g) or other undesired gasses, for instance since those gasses may be detrimental to health and/or may contribute to the greenhouse effect and/or are considered unpleasant. Examples of gasses of which an exhaust reduction may be desired are for instance ammonia ($NH_3$), acetone ($C_3H_6O$), dinitrogen oxide ($N_2O$), hydrogen sulphide ($H_2S$), ethylene ($C_2H_4$), fluor ($F_2$) or chlorine ($Cl_2$).

Hence, it is an aspect of the invention to provide an alternative method for the removal of a gaseous fluid as well as an arrangement therefore, which preferably further at least partly obviate one or more of above-described drawbacks and which is preferably relatively easily usable.

It is an aspect of the invention to provide a method for the removal of a gaseous fluid comprising:

a. applying an electric field between a first electrode arranged to generate a corona discharge and a second electrode comprising an haze-permeable electrically conductive sieve (also indicated as "conductive sieve" or "haze-permeable conductive sieve") of a plurality of conductive strands;

b. atomizing a liquid to providing a liquid haze between the first and the second electrode, wherein the liquid is a solvent for the gaseous fluid; and c. arranging a substrate behind, relative to the first electrode, the second electrode.

The invention uses the principles that the undesired gaseous fluid(s) may be at least partially dissolved in the liquid particles in the haze, and the fact that the electrode(s) create a kind of an "electric wind" and an electric charging of the liquid droplets of the haze, which will be directed by the "electric wind" due to the electric field between the electric source (first electrode) and the counter electrode (second electrode). The droplets are guided in the direction of the second electrode, which is haze permeable and which allows permeation of at least part of the haze, in a direction to the substrate, at which the droplets may deposit. At the substrate, collection of the undesired gaseous fluid, dissolved in the liquid of the haze, may take place.

For instance, in water dissolved ammonia may be collected at the substrate, and may in principle be reused. Hence, in an embodiment, the gaseous fluid is ammonia ($NH_3$) and the liquid is water. In a relatively easy way, an undesired gaseous fluid may be removed. The method may be applied in existing accommodations such as a shed, a stable, a sty, a fold, or a poultry farm. The term "accommodation" may relate to any cage, stable, shed, sty, fold, and also farm, for hosting one or more animals, especially a plurality of animals, such as pigs, cows, horses, goats, pigeons, birdhouse birds, tropical birds, gooses, mink animals or fir animals. The method may be applied within such building, or a unit (comprising an arrangement, see below), may be provided to which the air of the building is guided for treatment according to the invention. The phrase "method for the removal" includes a partial removal and does not necessarily indicate a total removal. However, the unit may for instance also be used to abate undesired gasses from for instance a laboratory, a plant, hospitality areas, etc.

Hence, to provide the effect of the invention, two electrodes are arranged, an electric field is applied, a liquid haze is provided between the two electrodes, and droplets, scavenging undesired gaseous fluids, may migrate to a negatively charged or grounded electrode. Especially when such electrode is permeable to air, even more permeable to a substantial part of the liquid haze droplets, such haze may travel "through" the permeable electrode, and at least partially be collected at the substrate, arranged downstream of the (second) electrode. The electric field is especially enforced by charged needle points, or line arranged constructions, and/or wires of the first electrode, which may generate corona discharges, which appears to be helpful in generating the electronic wind.

The electrodes are arranged in a space that contains or is able to contain a gas comprising the gaseous fluid. For instance, the electrodes may be arranged in a shed or another accommodation. Preferably, the electrodes are arranged at distances from each other such that a substantial part of the space is bridged with the electric field between the electrodes. As mentioned above, the electrodes may also be arranged in a (separate) unit, arranged to receive the gaseous fluid.

The electric field is especially in the range of about 0.1-100 kV/m. In a specific embodiment, the electric field is in the range of about 0.5-100 kV/m, even more especially in the range of about 2-100 kV/m, yet even more especially in the range of about 4-100 kV/m. Especially, the electric field may be smaller than about 50 kV/m, more especially smaller than 20 kV/m. The electric field is applied between a first electrode, especially being a positive electrode arranged to generate a corona discharge, and a second electrode, especially being an earthed electrode.

Preferably, the first electrode may comprise a plurality of conductive needles (herein also indicated as "needles"). Such first electrode comprising a plurality of needles may also be indicated as first electrode comprising a plurality of electrodes, since the plurality of needles are conductive needles, and thereby electrodes. Especially, the method further may further comprise arranging the plurality of conductive needles to point in the direction of the second electrode. Hence, in an embodiment, the plurality of conductive needles is arranged to point in the direction of the second electrode.

Preferably, the second electrode comprises a haze-permeable electrically conductive sieve (also indicated as "conductive sieve" or "haze-permeable conductive sieve") of preferably a haze-permeable electrically conductive sieve of a plurality of conductive strands. In an embodiment, the second electrode may comprise an haze-permeable electrically conductive sieve of a plurality of conductive strands having a shortest distance between adjacent conductive strands in the range of 0.01-1000 mm, such as 0.01-500 mm, like 0.1-1000 mm, such as 0.1-500 mm, especially at least 1 mm, like 1-500 mm, even more especially 1-100 mm, like 5-100 mm, such as at least 10 mm. In a specific embodiment, the second electrode comprises a plurality of conductive wires, preferably arranged substantially parallel to each other), especially a conductive wire gauze (i.e. conductive gauze).

The phrase "applying an electric field to the gaseous fluid" may indicate that an electric field is applied in a space where the gaseous fluid is present, such as in a room or a shed, etc.

The term "corona discharge" is known in the art. A corona is a process by which a current, perhaps sustained, develops from an electrode with a high potential in a neutral fluid, usually air, by ionizing that fluid so as to create plasma around the electrode. The ions generated eventually pass charge to nearby areas of lower potential, or recombine to form neutral gas molecules. When the potential gradient is large enough at a point in the fluid, the fluid at that point ionizes and it becomes conductive. If a charged object has a sharp point, the air around that point will be at a much higher gradient than elsewhere. Air (or another gas) near the electrode can become ionized (partially conductive), while regions more distant do not. When the air near the point becomes conductive, it has the effect of increasing the apparent size of the conductor. Since the new conductive region is less sharp (or curved), the ionization may not extend past this local region. Outside of this region of ionization and conductivity, the charged particles slowly find their way to an oppositely charged object and are neutralized. If the geometry and gradient are such that the ionized region continues to grow instead of stopping at a certain radius, a completely conductive path may be formed, resulting in a momentary spark, or a continuous arc. Corona discharge usually involves two asymmetric electrodes; one highly curved (such as the tip of a needle, or a small diameter wire) and one of low curvature (such as a plate, or the ground, or the herein indicated gauze). The high curvature ensures a high potential gradient around one electrode, for the generation of plasma.

Electric charges on conductors reside entirely on their external surface (see Faraday cage), and tend to concentrate more around sharp points and edges than on flat surfaces. This means that the electric field generated by charges on a curved conductive point is much stronger than the field generated by the same charge residing on a large smooth spherical conductive shell. When this electric field strength exceeds what is known as the corona discharge inception voltage (CIV) gradient, it ionizes the air about the tip, and a small faint purple jet of plasma can be seen in the dark on the conductive tip. Ionization of the nearby air molecules result in generation of ionized air molecules having the same polarity as that of the charged tip. Subsequently, the tip repels the like-charged ion cloud, and the ion cloud immediately expands due to the repulsion between the ions themselves. This repulsion of ions creates an "electric wind" that emanates from the tip.

The term "haze permeable" especially indicates that the haze may pass through the "sieve", especially at least part of the total number of droplets haze droplets arriving at the second electrode may penetrate through the openings or meshes between the conductive strands. In this way, the haze may be directed in a direction from the first electrode to the second electrode, "pass" the second electrode and be collected at the substrate, arranged downstream from the second electrode. The phrase, "behind the second electrode, relative to the first electrode" and similar phrases indicate that the substrate is arranged downstream of the second electrode.

The terms "upstream" and "downstream" relate to an arrangement of items or features relative to the propagation or flow of the electronic wind from a first electrode, wherein relative to a first position within the flow, a second position in the flow closer to the first electrode is "upstream", and a third position within the flow further away from the first electrode is "downstream". Hence, the first electrode is arranged upstream of the second electrode; the second electrode is arranged downstream of the first electrode, but arranged upstream of the substrate.

The phrase "atomizing a liquid" indicates that a liquid is at least partly transferred into (small) liquid droplets in the gaseous state, such as with steam, or a haze, or mist. The atomized liquid is herein indicated as "haze". The liquid atomizer relates to an apparatus or device that is able to atomize a liquid, i.e. provide liquid droplets in the gaseous state. Examples of atomizers are for instance an apparatus for boiling the liquid, or an ultra sonic haze generator, a (high) pressure atomizer, an electro spray, etc. The term "liquid atomizer" may in an embodiment refer to a plurality of liquid atomizers.

The haze is a solvent for the gaseous fluid. This may indicate that at least part of the gaseous fluid may be dissolved in the liquid droplets of the haze. An example may be ammonia gas that may be dissolved in water droplets. Another example of a gaseous fluid may be acetone ($C_3H_6O$), dinitrogen oxide ($N_2O$), hydrogen sulphide ($H_2S$), ethylene ($C_2H_4$), fluor ($F_2$) or chlorine ($Cl_2$). Other gaseous fluids may comprise gaseous hydrocarbons. Depending upon the gaseous fluid to be abated, also other liquids may be applied. For instance, the liquid may be chosen from the group comprising water, alcohol and also acetone. Acetone may be applied where for instance hydrocarbons (not acetone) is to be removed. This may especially be applied in a closed unit (see also below). The gaseous fluid is in general not a pure gas, but is in general present in another gas, such as air.

In a specific embodiment, the substrate is a cloth. Further, the substrate may be a lamellar cloth, or a (metal) gauze. In an embodiment, the substrate is also gas permeable. This means that at least part of the gaseous fluid and/or air, may also travel through the substrate. This may further facilitate a smooth flow of the gaseous fluid and air.

Especially, the substrate may be air-permeable, i.e. it may comprise openings or meshes through which air and/or the gaseous fluid may travel. The term "air permeable" especially indicates that air may pass through the substrate, especially at least part of the gaseous fluid may penetrate trough the openings or meshes. In this way, the haze may be directed in a direction from the first electrode to the second electrode, "pass" the second electrode and be collected at the substrate, arranged downstream from the second electrode. The substrate may have openings with dimensions (such as length, width or diameter) similar as those of the second electrode, such as in the range of 0.01-1000 mm, such as 0.01-500 mm, like 0.1-1000 mm, especially at least 1 mm, like 1-500 mm, even more especially 1-100 mm, like 5-100 mm, but preferably the dimensions are smaller, like in the range of 0.01-500 mm, such as 0.01-200 mm, like 0.1-200, such s 0.1-100 mm.

In a specific embodiment, the substrate is at least temporarily wetted with a liquid, preferably the same liquid as used to atomize, by an auxiliary moistener. In this way, the substrate may be maintained in a wet state, which may improve capture of the haze droplets. The term "auxiliary moistener" or shortly "moistener" is used to indicate a device that is arranged to moisten the substrate (i.e. at least part of the substrate), and which is different from the atomizer that is used to provide the liquid haze, and which haze may also moisten the substrate. In an embodiment, the method further comprises collecting liquid formed (deposited) at the substrate and removing the collected liquid.

In a further aspect, the invention provides an arrangement for removing a gaseous fluid comprising:

a. a first electrode, arranged to generate a corona discharge, and a second electrode comprising an haze-permeable electrically conductive sieve of a plurality of conductive strands;

b. a liquid atomizer arranged to atomize a liquid to providing a liquid haze between the first and the second electrode; and c. a substrate, arranged, relative to the first electrode, behind the second electrode.

Such arrangement may be arranged in an accommodation, such as a shed, a stable, a sty, a fold, or a poultry farm, but such arrangement may also be included in a separate unit, which may be arranged in gaseous contact with the air in the accommodation, for treatment of the air. Hence, in an embodiment the arrangement is comprised in a unit, having an inlet, arranged to allow the gaseous fluid enter the unit and an outlet, arranged to allow one or more of gas and liquid escape from the unit. The arrangement may further comprising one or more of a blower, arranged to blow gaseous fluid into the unit, and a pump, arranged to pump gas fluid into the unit. As will be clear to the person skilled in the art, one or more blowers and/or one or more pumps may be applied. The term "treatment" indicates the method for the removal.

In a specific embodiment, the arrangement further comprises an auxiliary moistener, arranged to wet the substrate.

As mentioned above, the first electrode preferably comprises a plurality of conductive needles. In an embodiment, the plurality of conductive needles are arranged to point in the direction of the second electrode. The haze-permeable electrically conductive sieve is in an embodiment a conductive wire gauze.

The first electrode and the second electrode are arranged at a non-zero distance, such as for instance in the range of 0.05-500 m, like 2-25 m In a further aspect, the invention provides an accommodation, especially for animals, comprising the arrangement. The arrangement may be included in the accommodation or may be in gaseous contact with the accommodation, but arranged outside of the accommodation, such as a separate unit arranged to treat the gas comprising the gaseous fluid, such as air comprising $NH_3$, within the accommodation. In an embodiment, the accommodation may be selected from the group consisting of a shed, a stable, a sty, a fold, and a poultry farm. Alternatively, the accommodation may for instance be selected from the group consisting of a laboratory, a plant and a hospitality area.

It further advantageously appears that the number of dust/small particles is reduced. Hence, the method and arrangement of the invention may be used to simultaneously reduce (abate) a gaseous fluid and small particles.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIGS. 3a-3b schematically depict some variants of the substrate;

FIGS. 4a-4c schematically depict some principles of the method; and

DESCRIPTION OF PREFERRED EMBODIMENTS

Figure 1A:
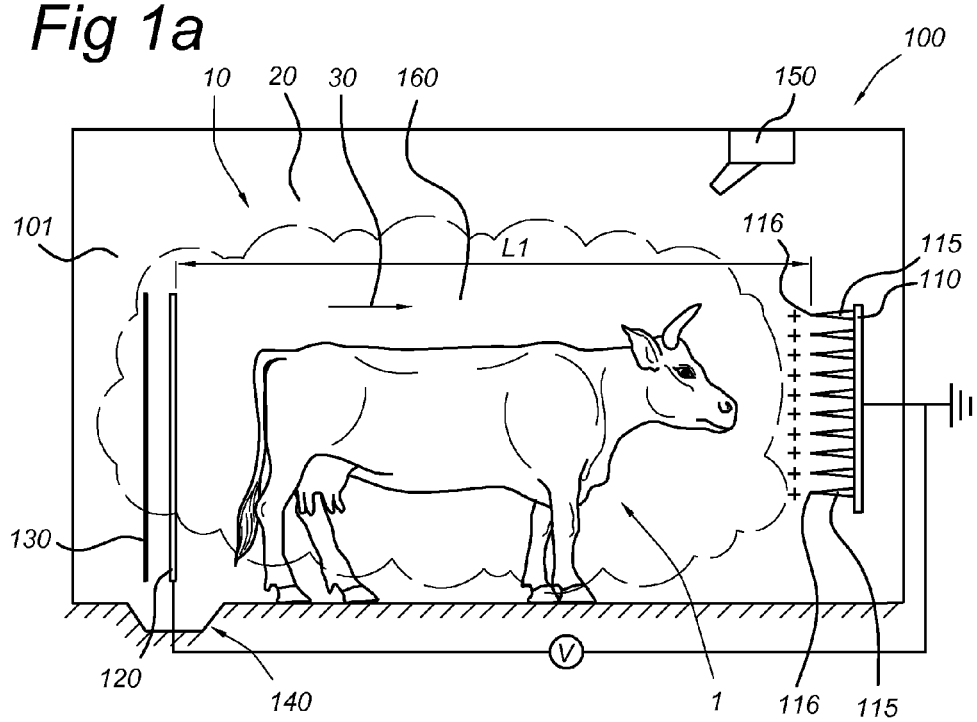
FIGS. 1a-1b schematically depict some embodiments of the invention.
Figure 1B:
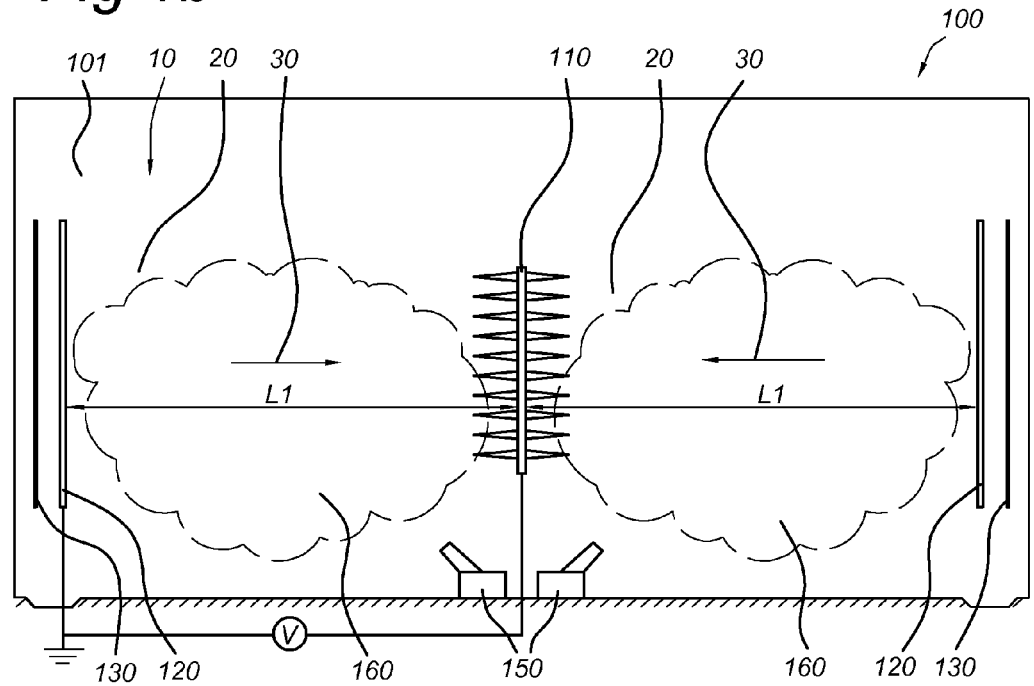

FIGS. 1a and 1b schematically depict an accommodation 100 for animals 1, such as a cow, comprising an arrangement 10. The accommodation is for instance selected from the group consisting of a shed, a stable, a sty, a fold, and a poultry farm. However, the method of the invention is not limited to such accommodations.

The arrangement 10 is used to remove a gaseous fluid. This may be a complete or partial removal. The removal may be performed in a batch or in a continuous process. For instance, the method of the invention (see also below), may be applied above a predetermined threshold value of a gaseous fluid. The gaseous fluid is indicated with reference 20 and is in general a component of air. For instance, air may comprise ammonia as gaseous fluid 20.

The arrangement 10 comprises a first electrode 110, arranged to generate a corona discharge and a second electrode 120 comprising an haze-permeable electrically conductive sieve of a plurality of conductive strands (see below). The arrangement 10 further comprises a liquid atomizer 150 arranged to atomize a liquid to providing a liquid haze 160 between the first and the second electrode. The arrangement 10 further comprises a substrate 130, arranged behind, relative to the first electrode 110, the second electrode 120.

The accommodation 100 has an internal space, indicated with reference 101, wherein the arrangement 10 is arranged. Further, one or more animals 1, such as one or more cows, may be present in the accommodation 100. With animal excretion and production of feces, the production of ammonia is concomitant. The presence of the undesired gaseous fluid, such as ammonia, is indicated with reference 20. The first electrode 110 and the second electrode 120 are arranged at a non-zero distance L1, such as for instance in the range of 0.05-500 m, like 2-500 m, such as especially 2-200 m, especially in the range of about 2-50 m, more especially in the range of about 5-25 m. Note that that there may be one first electrode 110 and a plurality of second electrodes 120, a plurality of first electrodes 110 and a plurality of second electrodes 120, and a plurality of first electrodes 110 and a plurality of second electrodes 120.

Here, the first electrode 110 may especially comprise a plurality of needles 115 with tips 116. The tips 116 are preferably directed to the second electrode 120. Hence, here the first electrode 110 comprises a plurality of conductive needles 115 and preferably, the plurality of conductive needles are arranged to point in the direction of the second electrode 120.

Preferably, the electrodes 110,120 are arranged in such a way, that they effectively span the internal space 101. The liquid atomizer 150 provides the haze 160 of droplets of a liquid. The gaseous fluid may at least partly be dissolved in the droplets. In this way the gaseous fluid may already be at least partly neutralized. However, due to the presence of the electric field, indicated with reference 30, the droplets are directed in a specific direction. Here, the corona discharges at the positively charged electrode propel the droplets, i.e. the haze 160, in the direction of the second electrode 120. The second electrode 120 may be negatively charged or may be grounded.

Since the second electrode 120 is permeable at least part of the haze 160 may travel through the second electrode 120 and may come into contact with the substrate 130. The substrate 130 is especially arranged to gather a substantial part of the droplets in the haze 160. Hence, the liquid condenses at the substrate 130 and may drip to the bottom, such as in a gutter 140. The collected liquid may be processed, for instance to separate the gaseous fluid component, such as ammonia from the liquid, where after the liquid may be reused and the gaseous fluid may be also be reused. For instance, ammonia may be used for fertilizer production.

FIG. 1b schematically depicts an embodiment, wherein the accommodation 100 is divided in several parts, and a plurality of arrangements 10 is arranged in the internal space 101 of the accommodation 100.

The droplets of the haze, especially water droplets, will in general be in the order of about 0.01 μm-3 mm, more especially about 0.1 μm-3 mm, like 0.1 μm-1 mm, like at least about 0.1 mm. Herein, the term conductive is known in the art, but especially refers to a resistivity of about $1 \cdot 10^{-9}$ Ω·m (at 20° C.) or less.

With reference to also FIGS. 2a-2d, some principles of the invention are further elucidated.

In a specific embodiment, the electric field is applied between a first electrode 110, especially arranged to generate a corona discharge and especially arranged to generate an electric field in the range of about 0.1-100 kV/m, and a second electrode 120, comprising a conductive wire, here especially comprising a conductive wire gauze 125. In an embodiment, the second electrode is earthed 121 (as depicted). However, in another embodiment, the second electrode 120 may be isolated and may be neutral or negatively charged. Especially in such embodiments, the first electrode 110 and the second electrode 120 are electrically connected, as indicated in the schematic FIG. 1a (and 1b; left variant).

Figure 2A:
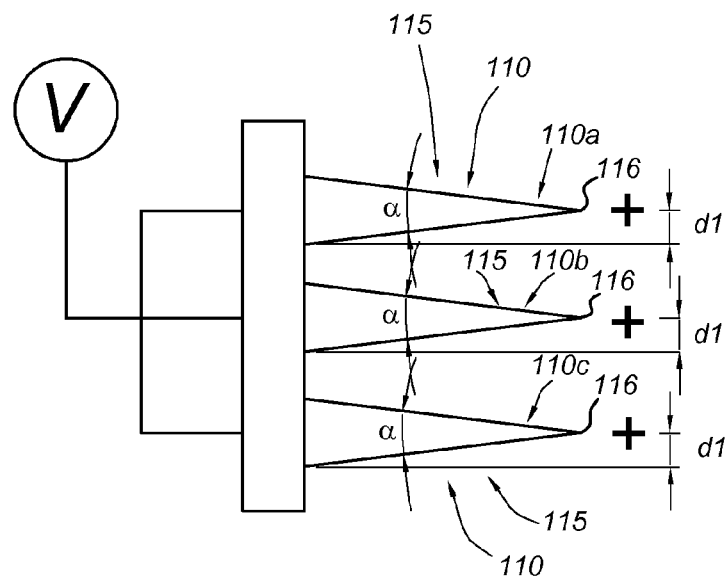
FIGS. 2a-2d schematically depict some variants of the first and second electrode.
Figure 2B:
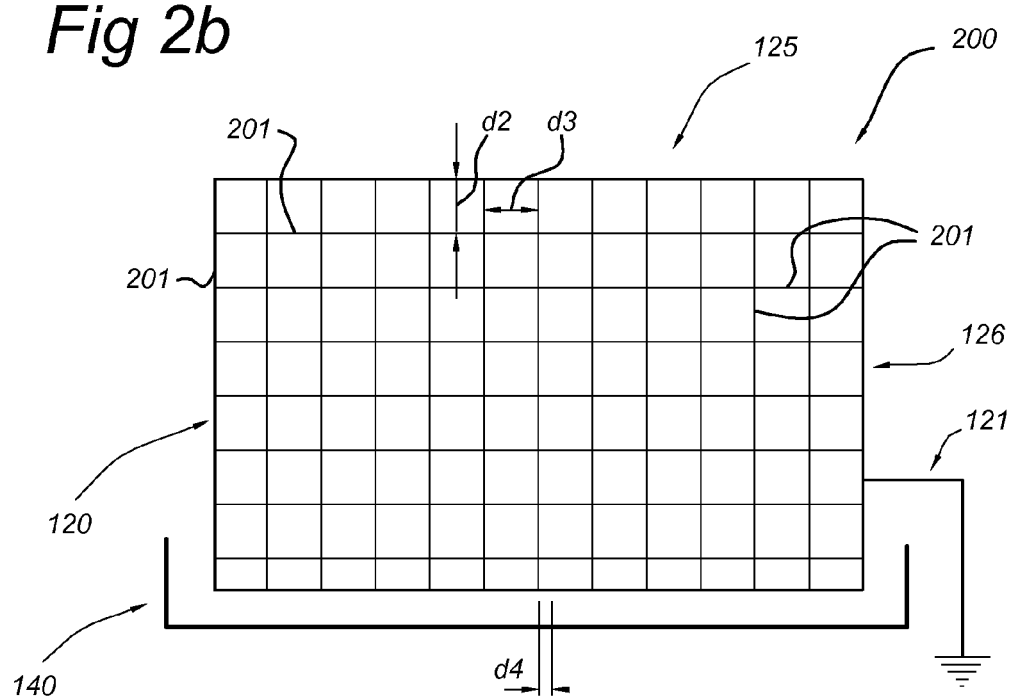

In general, the second electrode 120 comprises an haze-permeable electrically conductive sieve 200 (herein also indicated as "sieve") of a plurality of conductive strands 201 (see also FIG. 2b). As will be clear to the person skilled in the art, the terms "conductive sieve 200" and "conductive strands 201", refer to electrically conductive sieve 200 and electrically conductive strands, respectively.

This especially means that a plurality of conductive strands 201, be it conductive wires, be it conductive bars, be it a conductive gauze, etc., which strands 201 may be regularly or irregularly arranged (or a combination thereof), form a kind of sieve, be it a 1D sieve (like a "comb"), a 2D sieve (like a gauze) or a 3D sieve (like a 3D gauze or 3D frame work of wires), with a shortest distance between adjacent conductive strands (see also below, which are large enough to allow air and fog pass through. Preferably, in a 1D sieve, the strands are arranged substantially parallel. In a 2D sieve, in an embodiment subsets of strands may be arranged substantially parallel, but the subsets may be arranged under an angle. In yet another embodiment, the 2D sieve is arranged to provide square or rectangular meshes. In yet another embodiment, the 2D sieve is arranged to provide pentagonal, hexagonal, heptagonal or octagonal meshes, especially hexagonal meshes. Crossing strands may be knotted or fused. The person skilled in the art know types of different gauzes. 3D gauzes can be similar as 2D gauzes, but then in 3 directions.

The second electrode 120, especially the haze-permeable electrically conductive sieve 200, is a device having in an embodiment a substantially flat front (1D sieve or 2D sieve, etc.), formed by a plurality of strands 201, that is arranged to be directed to the first electrode 110. More especially, the curved features (see below) of the first electrode 110, such as the needles, substantially point in the direction of the second electrode 120, more especially the haze-permeable electrically conductive sieve 200. Preferably, the needles 115 of the first electrode 110 and the second electrode 120 are arranged to be perpendicular to each other (see also a number of accompanying drawings).

The electric field 30 is especially a static electric field. In a further embodiment, there may be a modulation on the electric field 30. Such modulation may be an on-off modulation, or may be a modulation on a constant value (for instance a sinusoidal modulation). However, the modulation is essentially not such, that the direction of the electric field 30 is inverted. Hence, referring to FIGS. 1*a*/1*b*, although temporarily the first electrode 110 might be uncharged, when charged, the charge is especially positive.

In another specific embodiment, a shortest distance L1 between the first electrode 110 and the second electrode 120 is in the range of about 0.05-500 m. In FIGS. 1*a* and 1*b*, the shortest distance is indicated with reference L1. Especially, the shortest distance between the first electrode 110 and the second electrode 120 in such configuration in a shed, etc. may be in the range of about 2-100 m, such as 2-50 m, especially 2-25 m, and in an embodiment 5-25 m.

FIGS. 1*a*/1*b* could for instance include one gauze 125 as second electrode 120; however, as will be clear to the person skilled in the art, a plurality of gauzes 125 may be applied; i.e. the arrangement 100 may comprise a plurality of second electrodes 120, especially a plurality of conductive gauzes 125. As mentioned above, these gauzes 125 may be arranged in an isolated way (i.e. not grounded). Thus, the haze-permeable electrically conductive sieve 200 here comprises a gauze 125. The schematic drawing depicts a 2D arrangement of conductive strands 201. The schematic drawing shows a subset of substantially parallel strands 201 and perpendicular thereto another subset of substantially parallel strands 201. The distances between substantially parallel strands (i.e. d2 and d3, see below), such as wires or bars, or the maze of the gauze 125, which may be used as second electrode 120, may especially between 0.01-1000 mm, such as about 0.1-500 mm, like in the range of 1-100 mm.

In a specific embodiment, the first electrode 110 comprises a plurality of electrodes, such as a plurality of electrically conductive needles, wherein the plurality of electrodes are arranged to generate corona discharges. In FIG. 2*a*, the plurality of electrodes is schematically with reference numbers 110*a*, 110*b*, 110*c* . . . .

In a preferred embodiment, the first electrode 110 comprises one or more conductive curved features or conductive needles (indicated with reference 115) having one or more dimensions in the range of for instance about 0.1 µm-0.5 mm. The curved feature may for instance comprise a wire, a wire mesh, an antenna or a needle, especially with the above defined dimensions. Especially needle like features are applied. Conductive needles are herein further indicated as needles. Needles are especially conductive protrusions or pins having mean aspect ratio's (mean: i.e. mean over the length of the needle) in the range of about 5-2000 (i.e. length/(mean thickness or mean diameter)), especially 10-2000, even more especially 20-2000. Hence, in a specific embodiment, the first electrode 110 comprises one or more, especially a plurality, such as 4-10,000, curved features 115, especially needles. The curved features 115, especially the needles, may have one or more dimensions, i.e. especially thickness, in the range of about 0.1 µm-0.5 mm, especially 1 µm-0.5 mm, more especially 10 µm-0.5 mm, even more especially 100 µm-0.5 mm, such as 10 µm-0.1 mm. Hence, the first electrode 110 especially comprises sharp points or needles. In general, the sharper the needle, the better.

In the figures, the curved features 115 are indicated as (sharp) needles, although also wires (optionally including cables), a wire gauze, etc. could be used. It is preferred the curved features have one or more dimensions in the range of about 0.1 µm-0.5 mm, which dimensions allow corona discharges. In FIG. 2*a*, curved features 115 are indicated, which have a dimensions d1 (here thickness or diameter). Here, the one or more dimensions might be diameter or thickness. The length of such curved features 115 (e.g. needle length; i.e. longitudinal length) may especially be in the range of about 0.5 mm-100 cm, especially in the range of about 5 mm-50 cm. Such curved features 115 may have angles of 140° or less, especially 90° or less, even more especially, 50° or less. These angles are in the schematic embodiment of FIG. 2*a* indicated with reference α. Especially preferred angles α are in the range of about 5-140°, more especially in the range of about 5-90°, yet even more especially in the range of about 5-50°, or even smaller. The tips of the curved features 115, here especially the tips of the needles, are indicated with reference number 116.

Hence, the figures also schematically show an embodiment of the arrangement 100, wherein the first electrode 110 comprises a plurality of conductive needles. Especially, the plurality of conductive needles are arranged to point in the direction of the second electrode 120 (as for instance shown in FIGS. 1*a* and 1*b*).

In this way, a kind of electronic wind may be generated. This "electric wind" is especially directed in the direction of the second electrode 120. Hence, even if grounded, the electric wind may be directed to the second electrode 120. The second electrode 120 is especially an electrode that allows further propagation of the droplets to the substrate 130. Hence, the second electrode 120 is especially in an embodiment a wire, more especially a plurality of wires or bars, which are arranged substantially parallel, like a 1D raster, or a plurality of wires or bars arranged as a gauze 125 (which may be indicated as 2D raster).

As mentioned above, the "electric wind" is especially directed in the direction of the second electrode 120. Hence, in a specific embodiment, the first electrode 110 and the second electrode 120 are arranged to generate an electric wind in the direction of the second electrode 120. Amongst other, this may be done by providing an isolated second electrode 120 with especially a negative charge (during use of the arrangement 100). Further, this might also be done by directing the curved features 115, especially the needles, in the direction of the second electrode 120.

Herein, in an embodiment, the term "wire" or "conductive wire" may also relate to "cable" or "conductive cable", respectively.

In a specific embodiment, the electrically conductive haze-permeable electrically conductive sieve 200, such as in an embodiment the wire gauze 125 comprises meshes with one or more dimensions (such as length, width or diameter) in the range of about 0.01-1000 mm, such as preferably 0.1-1000 mm, especially in the range of about 0.1-500 mm, even more especially 1 mm up to 100 mm. These dimensions let the fluid 20 pass through the sieve 200, and allow the droplets accumulate at the conductive strands 201. The dimensions are schematically depicted in FIG. 2*b*, wherein d2 and d3 indicate distances between neighbouring (i.e. adjacent) wires (i.e. the length and width), indicate with reference 126, gauze 125. Yet in another embodiment, the second electrode 120 comprises a plurality of conductive wires (including cables) which are arranged substantially parallel, and the distance between the wires is in the range of about 0.01-1000 mm, such as 0.1-1000 mm, especially in the range of about 0.1-500 mm (even more especially 1 mm up to 100 mm). Herein, the term "plurality of wires" especially relate to about 4-500 of such wires. Such gauzes 125 or plurality of wires may effectively catch the droplets and scavenge the droplets from the gaseous fluid 20.

Hence, in a specific embodiment, wherein the second electrode 120 comprises a plurality of wires, be it arranged substantially parallel or be it arranged in a wire gauze, the longest distance between two adjacent substantially parallel arranged wires is preferably in the range of 0.01-1000 mm, especially 0.1-1000 mm, especially in the range of about 0.5-500 mm, such as especially 1-500 mm, such as especially about 5-100 mm).

Therefore, the second electrode comprises conductive strands, wherein a shortest distance between adjacent (substantially parallel arranged) strands is 0.01-1000 mm, especially 0.01-500 mm, even more especially 0.1-1000 mm, such as 1-500 mm, or 1-100 mm, preferably 5-100 mm.

Figure 2C:
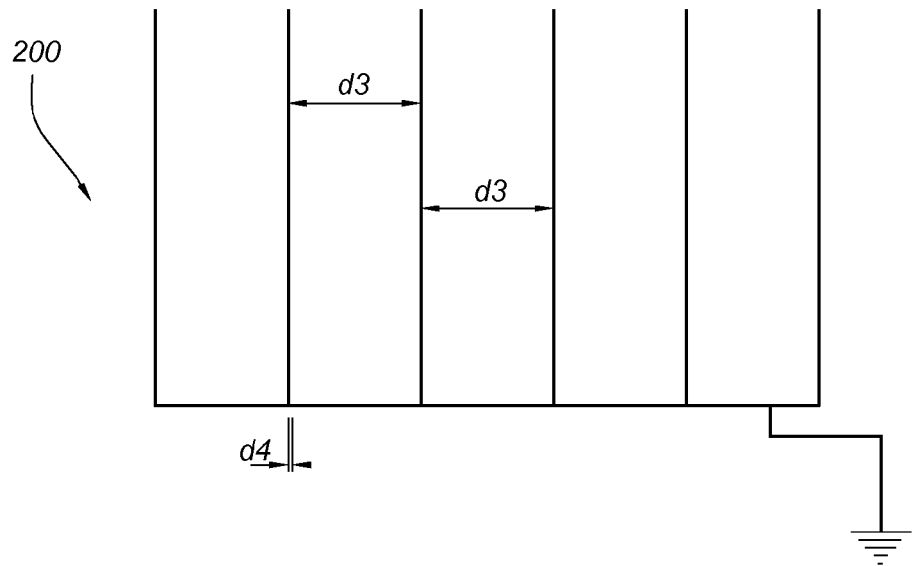

In a 1D sieve, a shortest distance may be the shortest distance between two adjacent strands 201, such as indicated with d3 in FIGS. 2b and 2c. In a 2D sieve, such as depicted in FIG. 2b, a shortest distance may be a diameter, but may also be a length and/or a width, i.e. d2 and d3, respectively. Preferably at least 1 of these distances fulfils the condition that the shortest distance between adjacent conductive strands is about 0.01-500 mm. It is not necessary that also the other distance fulfils this condition, although in a preferred embodiment, this is the case. Likewise, in a 3D sieve (not depicted) a shortest distance may be a diameter, but may also be a length and/or a width and/or a depth. Preferably at least 1 of these distances fulfills the condition that the shortest distance between adjacent conductive strands is about 0.01-1000 mm. It is not necessary that also the other distance fulfills this condition, although in a preferred embodiment, this is the case. Distances d1 and d2, etc. are especially shortest distances between substantially parallel arranged strands 201.

In systems wherein meshes are present, such as in 2D gauzes, such meshes may have any shape, and in such systems, as a shortest length between adjacent strands, the mesh diameter may be chosen.

The dimensions of the conductive strands 201, indicated with reference d4, which may, dependent upon the type of conductive strands 201 be the diameter, or the mean diameter, or the width(s), are preferably in the range of about 0.05-50 mm, especially in the range of about 1-20 mm.

In an embodiment, not depicted, the haze-permeable electrically conductive sieve comprises a plurality of substantially parallel arranged electrically conductive plates. Again, this may be a 1D arrangement or a 2D arrangement. The distances between substantially parallel plates (i.e. d2 and d3), or the maze of the "plate" gauze 125, which may be used as second electrode 120, may especially between 0.01-1000 mm, such as about 0.1-1000 mm. The invention is further herein described by using a plurality of strands.

Figure 2D:
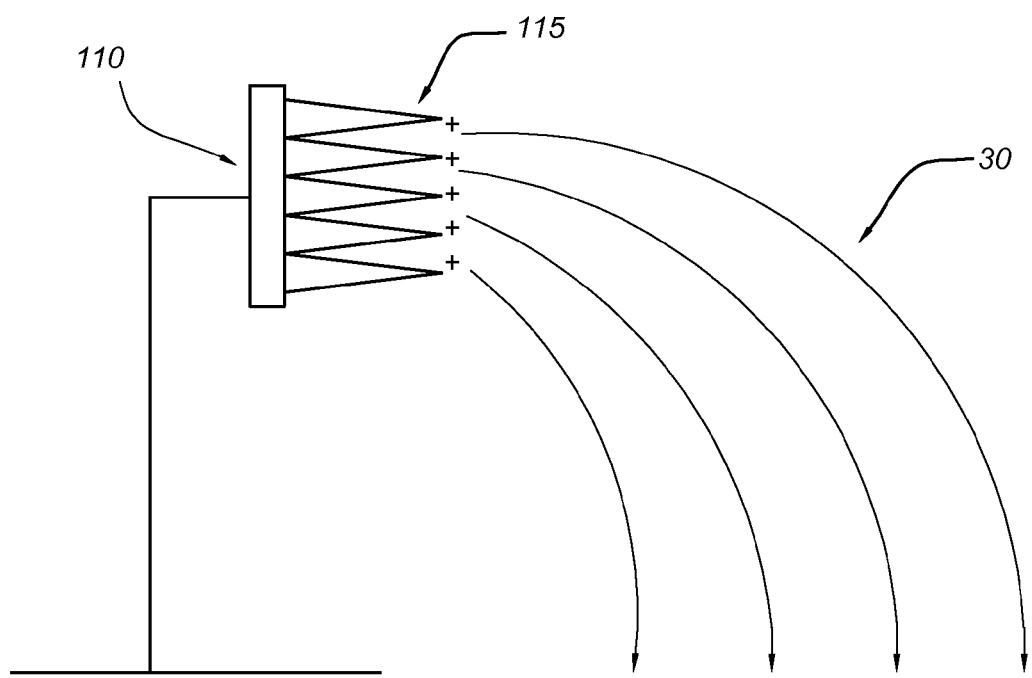

FIG. 2c schematically depicts a 1D (array) of conductive strands 201, arranged as a kind of fence, as sieve 200. The meshes are indicated with reference d3. The meshes may vary over the sieve 200. FIG. 2d schematically depicts the field 30 when the second electrode 120 is absent (for example FIG. 2d) or present (2e). Especially when using a (positively) charged first electrode 110 and a counter electrode (second electrode 120) the advantages of the invention may be achieved.

Preferably, the needles (or other sharp feature containing conductive items) and second electrode, especially thus the haze-permeable electrically conductive sieve 200, are arranged perpendicular, in the sense that the (plurality of) electrode(s) point in the direction of the second electrode 120.

FIGS. 3a and 3b schematically depict embodiments of the substrate 130. For instance, in FIG. 1a the substrate 130 may comprise a cloth 131, at least partly arranged in a liquid reservoir 132 comprising liquid 133. Due to this arrangement, the liquid may 133 may wet at least part of the substrate 130. The fact that the substrate 130 is wetted is schematically shown by the drops 134, dripping from the substrate 130. Hence, in a specific embodiment, the substrate 130 is arranged to be wetted during use of the method of the invention. The wet surface may facilitate collecting the droplets of the haze 160. As will be clear to the person skilled in the art, instead of a cloth, also another substrate may be applied. An advantage of a cloth 131 may be that it may be at least partially permeable to air or other gases comprising the gaseous fluid. Further, instead of this wetting method, also other wetting method may be applied. The moistener, here liquid reservoir 132 filled with liquid 133, is indicated with reference 137.

FIG. 3b schematically depicts another embodiment, wherein the substrate is a kind of sieve, indicated with reference 135. Over the sieve, one or more moisteners 137, such as showers or sprinklers are provided, indicated with reference 135.

The substrate 130 may be permeable to the gaseous fluid, such as ammonia (in air). For instance, the substrate 130 may comprises a plurality of (substantially parallel) arranged strands, wires, or plates. Again, this may be a 1D arrangement or a 2D arrangement. The distances between substantially parallel plates (i.e. d12 and d13) may especially between 0.01-500 mm, such as about 0.1-100 mm.

Where applicable, the dimensions given for d2, d3, d12, d13 may also relate to diameter. Hence, these dimensions may also be interpreted as effective diameters.

Further, the second electrode 120 may also be used as directional electrode, since due to the presence of the second electrode 120, the fluid, or at least the charged droplets therein, are moved in the direction of the second electrode 120. Hence, the fluid may also penetrate the second electrode 120, and for instance, be received by the substrate 130 arranged to receive the charged droplets. Such substrate 130 may be a plate with a collector. An example thereof is schematically depicted in FIG. 4a, wherein the electronic wind may blow through the second electrode 120. Part of the droplets may accumulate at the second electrode 120, but part of it may also penetrate through the second electrode 120 and be accumulated at the substrate 130, with for instance collector 140, here in the form of a gutter.

The substrate 130 may thus especially be arranged gravity to collect the droplets from the haze. The droplets may aggregate or condense at the substrate, such as at wires, and fall by gravity, where the collector 140 collects the droplets. Collector 140 may for instance be a gutter or a drain.

Figure 4B:
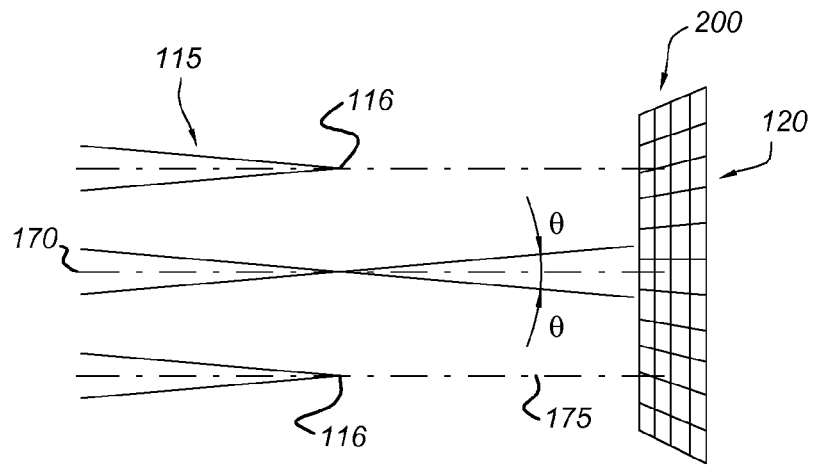

FIG. 4b schematically depicts preferred arrangements of the first and the second electrodes 110,120. The first electrode 110 comprises a plurality of needles as curved features 115. Note that the "curve features" may have sharp edges as tips. The term "curved feature" may especially indicate that surfaces merge together into a tip, such as in the case of a wedge or a needle. Especially needles are preferred. Such needle may comprise a longitudinal axis or "needle axis", which preferably point in the direction of the second electrode 120. In FIG. 4b, the longitudinal axis is indicated with reference 175. Relative to this longitudinal axis 175, in the direction of the tip 116, a virtual cone can be construed, having a cone angle $\theta$. The virtual cone is construed by providing a surface having an angle $\theta$ relative to the longitudinal axis 175; a symmetric cone will have an opening angel $2\theta$. Here the phrase "arranging the curved features (or needles) 115 in such a way that the tips 116 are aligned in the direction of the second electrode 120", and similar phrases, especially indicate that at least part of the second electrode 120 will be arranged within this virtual cone of at least one of the needles. Preferably, especially in the case of a plurality of needles, the cone angle θ is 30°, more preferably 20°, more preferably 10°, even more preferably 5°. This means that within the virtual cone having a cone angle of 10°, the second electrode will be found. In case the second electrode 120 is arranged precisely opposite of the first electrode 110, the longitudinal axis 175 will "intercept" the second electrode. In FIG. 4*b*, a "perpendicular" arrangement of the plurality of needles relative to the second electrode, especially the electrically conductive air permeable sieve 200.

In the case of one single needle, θ may larger, but is preferably smaller than 90°.

Figure 4C:
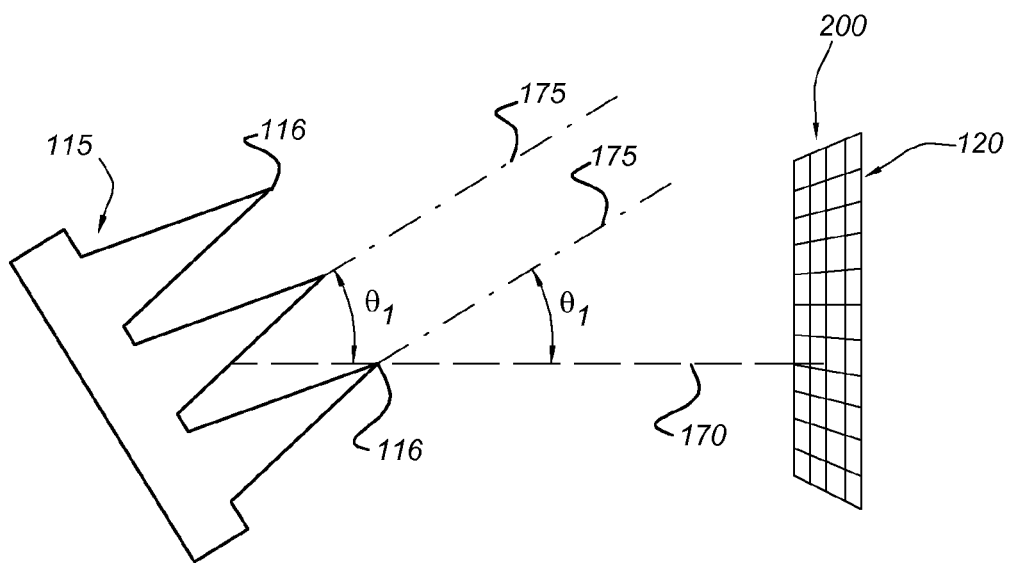

Alternatively, see FIG. 4*c*, the curved features (or needles) needles 115 may point in a direction with an angle θ1, relative to a horizontal 170 starting from the first electrode 115 and extending to the second electrode 120; again, angle θ1 is preferably in the range of 0-30°, more preferably 0-20°, more preferably 0-10°, even more preferably 0-5°. In FIG. 4*c*, angle θ1 would be 0°.

Figure 5:
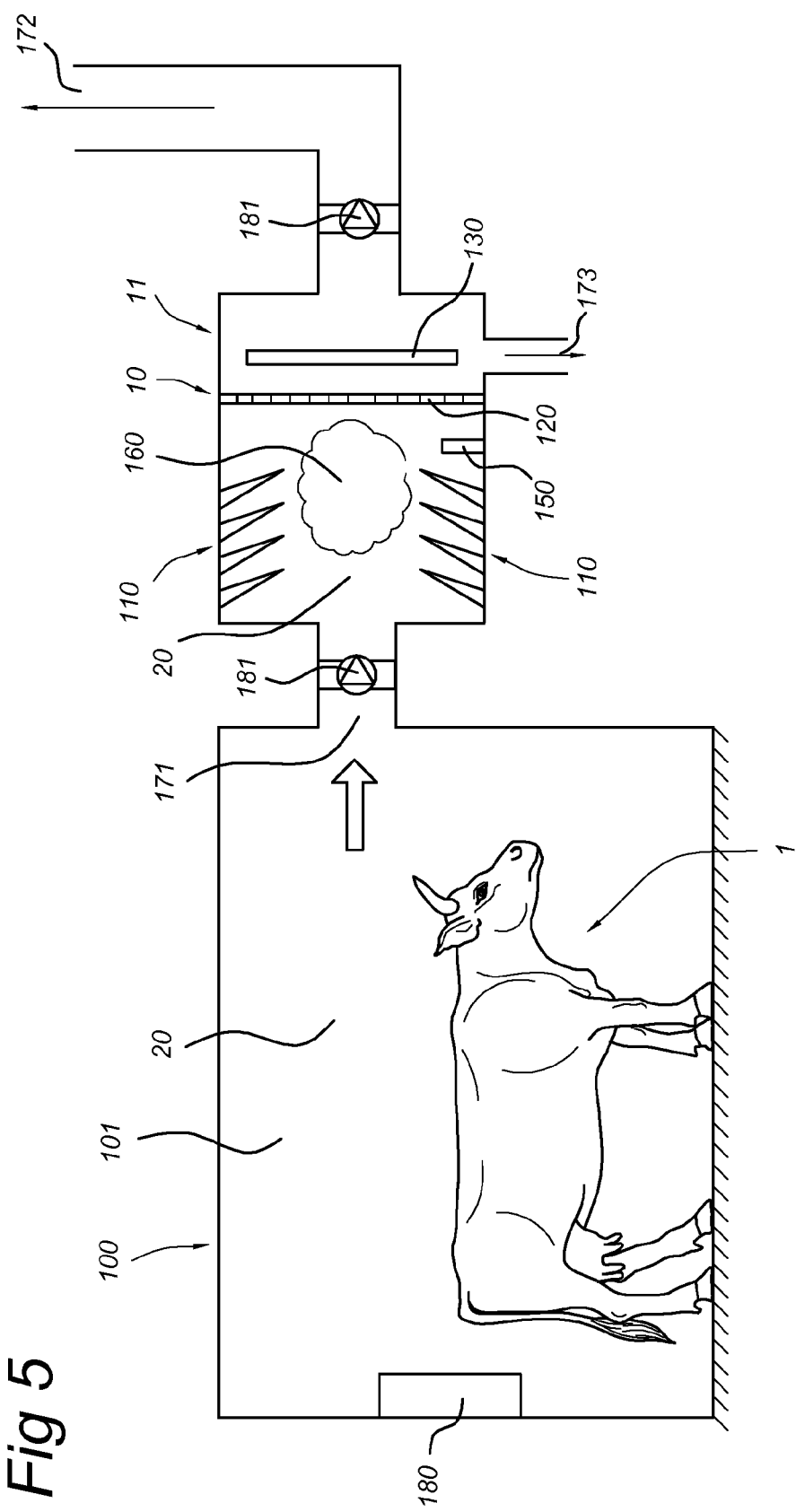
FIG. 5 schematically depicts an embodiment of the invention, wherein the arrangement is external from an accommodation for animals.

FIG. 5 schematically depicts an embodiment of an embodiment of an accommodation 100, wherein the arrangement 10 is arranged external from the accommodation, or at least arranged external from the part wherein the source of the gaseous fluid 20, here animal(s) 1, is (are) located. The arrangement 10 may be comprised by a unit 11, having an inlet 171, arranged to receive a gas comprising the gaseous fluid. The accommodation 100 and unit 11 are arranged to allow the gaseous fluid enter via inlet 171 into the unit comprising the arrangement 10. Further, the accommodation and/or the unit may further comprise one or more pumps 181, and/or one or more vents 180. By way of example, a variant is shown comprising vent 181, and two pumps 181, but in principle one or more of these, or additional vents or pumps may be present. A vent may be arranged to blow at least part of the gas comprising the gaseous fluid into the unit 11 (via inlet 171); a pump 181 may be arranged to pump gas comprising the gaseous fluid 20 into the unit; a pump 181 may be arranged to pump gas out of the unit 11 via exhaust 172. Also in the latter variant, such pump may be used to pump gas into the unit 11 via inlet 171.

As mentioned above, the unit 11 may have an exhaust 172, which may exhaust gas (optionally comprising liquid droplets) and optionally liquid from the liquid haze. Liquid may also be exhausted separately, which is schematically indicated with an exhaust 173, which may especially be arranged to let liquid (from the liquid haze) escape, and optionally also in the liquid dissolved fluid from the gaseous fluid. In general, the unit 11 will have at least one inlet 171 and at least one outlet, wherein in between the arrangement 10 is arranged.

The shortest distance L1 between the first and the second electrode in a unit 11 may be smaller than in an accommodation 100, and may for instance be in the range of 0.05-5 m, like 0.05-2 m, such as 0.1-1 m.

Other configuration than described above or schematically depicted in the accompanying drawings may also be possible.

In another embodiment of the invention, the substrate is made of non-conductive material and is positioned between the first electrode and the second electrode, more particularly between the second electrode and the haze generators. In this embodiment, the droplets are accumulated at the substrate before reaching the second electrode. The substrate may thus especially be arranged vertically or slanted to collect the droplets from the haze. The droplets may aggregate or condense at the substrate, such as at wires, and fall by gravity, where a collector collects the droplets. Preferably, in this embodiment the non-conductive substrate comprises a sieve; i.e. here a sieve of non-conductive material. The dimensions of this sieve, like distance between strands, may be identical to the embodiments described above for the haze-permeable electrically conductive sieve.

In another embodiment, the substrate has a cold surface. In another embodiment of the invention, the substrate is replaced by a device with a cold surface. Cold in this context means a temperature which is about (±5° C. more particularly ±2° C.) the dew point (=100% relative humidity) or condensation point of the air in the accommodation. However the temperature of the cold surface is preferably above 0° C. For instance, cold may herein refer to a temperature above 0° C., but equal to or below 15° C., such as equal to or below 10° C., like equal to or below 5° C. The droplets will condensate at the cold surface and fall by gravity down, for instance into a collector, which is positioned below the cold surface.

In another embodiment of the invention, the second electrode is arranged to provide the cold surface. In this embodiment, the droplets may condensate at the surface of the second electrode. Hence, in a specific aspect, the invention also provides an arrangement for removing a gaseous fluid comprising (a) a first electrode, arranged to generate a corona discharge, and a second electrode comprising an haze-permeable electrically conductive sieve of a plurality of conductive strands; and (b) a liquid atomizer arranged to atomize a liquid to providing a liquid haze between the first and the second electrode; wherein the second electrode is configured to provide a cold electrode surface (i.e. especially conductive strands that are cold (as indicated above). Hence, in another aspect, the invention may also provide a method for the removal of a gaseous fluid comprising (a) applying an electric field between a first electrode arranged to generate a corona discharge and a second electrode, comprising an haze-permeable electrically conductive sieve of a plurality of conductive strands; and (b) atomizing a liquid to providing a liquid haze between the first and the second electrode, wherein the liquid is a solvent for the gaseous fluid; and wherein the second electrode has a cold electrode surface.

EXAMPLE 1

Air from a roof ventilation system of a stable with a large amount of pigs was led via a flexible tube to a box of 1 m×1 m×1.5 m. The box contains a conductive panel with sharp tips, to which a positive voltage of 20 kV is applied. In this way, corona discharges are generated at the tips, which cause a gas flow from the tips away. This so-called electronic wind is directed to a gauze having a gauze size of 1 cm, behind which a wet cloth is arranged.

Three haze generators generate by means of ultrasonic waves a water haze of small droplets. This haze is fed to the box. The haze droplets catch part of the ammonia, which may lead to ammonia hydroxide in the droplets, which is propelled to the wet cloth. Part of the ammonium hydroxide may deposit on the gauze and part will be absorbed by the wet cloth. The wet cloth is saturated or becomes saturated; drops drip in a reservoir.

Dräger tubes were applied to measure the ammonia concentration in the stable. The concentration was below the detection point, which indicates a low ammonia content.

Special embodiments of the invention are summarized below:

1. A method for the removal of a gaseous fluid comprising
   a. applying an electric field between a first electrode arranged to generate a corona discharge and a second electrode, comprising an haze-permeable electrically conductive sieve of a plurality of conductive strands;

b. atomizing a liquid to providing a liquid haze between the first and the second electrode, wherein the liquid is a solvent for the gaseous fluid; and c. arranging a substrate behind, relative to the first electrode, the second electrode.

2. The method according to method of removal embodiment(s) 1, wherein the gaseous fluid is ammonia ($NH_3$) and wherein the liquid is water.

3. The method according to any one of the preceding method of removal embodiment(s), wherein the substrate is a cloth.

4. The method according to any one of the proceeding method of removal embodiment(s), wherein the substrate is at least temporarily wetted with the liquid by an auxiliary moistener.

5. The method according to any one of the proceeding method of removal embodiment(s), further comprising collecting liquid formed at the substrate and removing the collected liquid.

6. An arrangement for removing a gaseous fluid comprising a. a first electrode, arranged to generate a corona discharge, and a second electrode comprising an haze-permeable electrically conductive sieve of a plurality of conductive strands;

b. a liquid atomizer arranged to atomize a liquid to providing a liquid haze between the first and the second electrode; and c. a substrate, arranged, relative to the first electrode, behind the second electrode.

7. The arrangement according to the arrangement embodiment(s) 6, further comprising an auxiliary moistener, arranged to wet the substrate.

8. The arrangement according to any one of the arrangement embodiment(s) 6-7, wherein the arrangement is comprised in a unit, having an inlet, arranged to allow the gaseous fluid enter the unit and an outlet, arranged to allow one or more of gas and liquid escape from the unit.

9. The arrangement according to the arrangement embodiment(s) 8, further comprising one or more of a blower, arranged to blow gaseous fluid into the unit, and a pump, arranged to pump gaseous fluid into the unit.

10. The arrangement according to any one of the arrangement embodiment(s) 8-9, wherein the first electrode comprises a plurality of conductive needles.

11. The arrangement according to the arrangement embodiment(s) 10, wherein the plurality of conductive needles are arranged to point in the direction of the second electrode.

12. The arrangement according to any one of the arrangement embodiment(s) 6-11, wherein the haze-permeable electrically conductive sieve is a conductive wire gauze.

13. An accommodation for animals comprising the arrangement according to any one of the arrangement embodiment(s) 6-12.

14. The accommodation according to the arrangement embodiment(s) 13, wherein the accommodation is selected from the group consisting of a shed, a stable, a sty, a fold, and a poultry farm.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage. The term "about" herein, may, especially in numerical embodiments, relate to values within a range of +10% and −10% of the indicated value, especially within a range of +5% and −5% of the indicated value, especially within a range of +2% and −2% of the indicated value. Hence, a value of about 100 kV may indicate 100.0 kV, but may also be within the range of 90-110 kV. This may also apply to numerical values in front whereof the word "about" is not added. Slight deviations may be allowable, as will be clear to the person skilled in the art.

The invention claimed is:

1. A method for the removal of a gaseous fluid comprising
   a. applying an electric field between a first electrode, being a positive electrode, arranged to generate a corona discharge and a second electrode, comprising a haze-permeable electrically conductive sieve of a plurality of conductive strands;
   b. atomizing a liquid to providing a liquid haze between the first and the second electrodes, wherein the liquid is a solvent for the gaseous fluid; and
   c. arranging a substrate behind, relative to the first electrode, the second electrode.

2. The method according to claim 1, wherein the gaseous fluid is ammonia ($NH_3$) and wherein the liquid is water.

3. The method according to claim 1, wherein the substrate is a cloth.

4. The method according to claim 1, wherein the substrate is at least temporarily wetted with the liquid by an auxiliary moistener.

5. The method according to claim 1, further comprising collecting liquid formed at the substrate and removing the collected liquid.

6. The method according to claim 1, wherein the first electrode comprises a plurality of conductive needles.

7. The method according to claim 6, wherein the plurality of conductive needles are arranged to point in the direction of the second electrode.

* * * * *